United States Patent [19]

Koss

[11] Patent Number: 5,129,934
[45] Date of Patent: Jul. 14, 1992

[54] METHOD AND APPARATUS FOR BENDING GLASS SHEETS

[75] Inventor: George A. Koss, Dearborn Heights, Mich.

[73] Assignee: Ford Motor Company, Dearborn, Mich.

[21] Appl. No.: 633,741

[22] Filed: Dec. 24, 1990

[51] Int. Cl.⁵ .............................................. C03B 23/027
[52] U.S. Cl. ........................................... 65/107; 65/291
[58] Field of Search ........................... 65/107, 291, 290

[56] References Cited

U.S. PATENT DOCUMENTS

| | | |
|---|---|---|
| 2,551,606 | 5/1951 | Jendrisak . |
| 2,608,799 | 9/1952 | Babcock . |
| 2,633,673 | 4/1953 | Bamford et al. . |
| 2,857,713 | 10/1958 | Cleminson . |
| 3,088,300 | 5/1963 | Elliott .................... 65/288 |
| 3,192,029 | 6/1965 | Black ..................... 65/289 |
| 3,197,298 | 7/1965 | Johnston et al. ........ 65/291 |
| 3,220,819 | 11/1965 | Jendrisak ............... 65/291 |
| 3,241,936 | 3/1966 | Leflet, Jr. et al. . |
| 3,248,201 | 4/1966 | Black et al. ............ 65/290 |
| 4,002,450 | 1/1977 | Hamilton ................ 65/107 |
| 4,015,969 | 4/1977 | Brown et al. ........... 65/289 |
| 4,082,529 | 4/1978 | Kelly ..................... 65/273 |

Primary Examiner—Joye L. Woodard
Attorney, Agent, or Firm—Randolph A. Smith; Roger L. May

[57] ABSTRACT

A bending fixture for gravity bending a glass sheet or sheets to produce, for example, automobile windshields. The bending fixture has a pair of fixture sections, each having a shaping surface segment with two ends. The fixture sections are hinged to each other at their ends to define a single hinge axis. The hinge axis is immediately adjacent the support surface at the ends of the shaping surface segments and is generally laterally centered in the fixture. The bending fixture supports a flat cold glass sheet or sheets at the hinge area and at points laterally remote from the hinge area. In the closed position after bending, the support segments together form a continuous peripheral support surface for the glass sheet.

7 Claims, 2 Drawing Sheets

METHOD AND APPARATUS FOR BENDING GLASS SHEETS

INTRODUCTION

The present invention relates to a glass bending fixture, and more particularly to a glass bending fixture used to fabricate glass products, such as automotive windshields.

BACKGROUND OF THE INVENTION

Bending fixtures have been used for many years in the fabrication of glass products from flat glass sheets and numerous types of bending fixtures are well known in the glass industry. Typically, a bending fixture provides a narrow support surface forming a ring or the like in a generally horizontal plane. A flat glass sheet is laid upon the support surface, the support surface contacting the bottom surface of the glass sheet at or near the outer periphery, usually about 5 to 15 mm from the edge of the glass. Therefore, the main area of the glass sheet is usually untouched during the bending process. For this reason, high quality surfaces can be produced. Automotive windshields are usually fabricated using bending fixtures, because of the industry's high quality requirements for windshields. In contrast, side and back windows often are formed using press forming equipment, although bending fixtures also can be used.

In a traditional method of gravity bending thin, flat sheets of glass into curved shapes such as automobile windshields, cold, pre-cut single or multiple glass sheets are placed onto the rigid, pre-shaped, peripheral metal support surface of a bending fixture. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass. The occasional slight surface markings along the periphery may subsequently be concealed by the glass framing means or the markings may be tolerated as inconsequential because they are located at the very edge of the vision area.

Bending fixtures, also known in the industry as bending irons and skeleton molds, are constructed according to various designs and may be comprised of any number of materials. Exemplary bending fixtures are disclosed in U.S. Pat. No. 3,068,672 to Black and in U.S. Pat. No. 3,161,493 to Golightly and in U.S. Pat. No. 3,356,480 to Golightly. Although the bending fixtures currently used in industry are not uniform in design, there are several common design features. For all but modest or shallow bends, the peripheral support surface is often divided into a relatively flat central portion and two, usually symmetrical, more deeply bent "wings." The wing portions of the bending fixture frequently are connected by hinges to the central portion to complete the continuous, peripheral support. The hinged wing portions are provided in the belief that unless the final shape of the support frame approximates a catenary curve, gravity alone will not force the hot glass into the desired shape or form. Specifically, the hinged wings are used to apply bending force to accelerate the bending of the glass sheet along the sharpest bend lines.

In some bending fixture designs, the "wing bending effort" is reinforced or magnified by the addition of fixed or adjustable-length counterweights. The counterweights help rotate the wings upwardly about the hinge axis (relative to the center portion of the bending fixture) into the closed position during the bending process. In other designs the wing bending effort is increased by the addition of various systems of suspension links and hinges to hold the wings up while the central area sags, such that the weight of the central glass portion provides leverage or motivating force for the wing bending action. In the open position, in which the bending fixture would support a flat glass sheet, the wings generally are in a horizontal plane with the central portion of the fixture. In this position the flat glass sheet typically is supported at the four points where the support surface is hinged, that is, at the four points where the central portion of the bending fixture is hinged to the two wings. The glass would also be supported at points laterally outward of the hinge points, specifically, by outer points on the wings. The glass sheet is unsupported, however, between the hinge points, that is, across the large central portion.

In most currently known bending fixtures used to produce, for example, symmetrical windshields, the number of hinges or pivots employed for the support surface and wing bending function varies from as few as four to as many as twelve. When in use, the bending fixtures are continuously cycled from temperatures near room temperature to temperatures which may reach 650 degrees Celsius. Because of this cycling, most fixture hinges are difficult to lubricate and maintain. It would be advantageous, therefore, to reduce the number of hinges, etc. used in a bending fixture.

Most support frames locate the peripheral support "parting lines," that is, the hinge axes extending between the wings and the central support rails, directly at or in the vicinity of the tightest curves, that is, along the bends having the shortest bend radii. The assumption is that the lever or fulcrum action of the hinged wing is of most benefit in advancing the bending of the glass along the axis of the tightest bend. In practice, this works fairly well if the glass to be shaped is relatively thick, its vertical height is not too large, and the installation angle (for example, the so called "lay-down angle" of a windshield in a car) is not too severe. Even then, optical distortion bands along the wing hinge axes are common and may be objectionable, particularly in windshields with deep bends. Additionally, because during the bending phase the "hinge junctions" of the curved support surface (between the wings and the central portion) represent "high points", that is points on which large portions of the total glass weight rest, troublesome "hinge kinks" frequently develop at these points. In their mild form, hinge kinks cause localized distortions in "reflected appearance" or "showroom beauty". In their more severe form, they are a frequent cause of "edge penetration" and may ultimately cause the finished product to be scraped.

With new automobile designs, windshield bending requirements have changed. Laminated windshields frequently now are made from thinner glass, often as thin as 1.8 mm, in contrast to 3.2 mm thick glass in earlier bent windshields. Also, windshield installation angles have increased to as much as 62 degrees or more from the vertical. Therefore, new windshields have a greater surface area and reduced width to height aspect ratios. The increased angle also results in a longer light path within the windshield and the refractive power of any disturbance or distortion in the glass is correspondingly greater.

Due to the increased width to height aspect ratios, thin cold glass now must span a larger top-to-bottom distance when loaded onto a bending fixture. The distances between the "cold" support points for large volume windshield designs have increased by as much as a factor of two in recent years. As noted above, a flat glass sheet positioned on a typical bending fixture in the open position is unsupported across the large central portion of the bending fixture between the hinge points at the wings. This causes much larger beam deflections and, so, increases the tensile stresses within the glass. This, in turn, increases production losses due to breakage of the glass prior to heating. It would be advantageous, therefore, to reduce the distance spanned by a flat sheet on a bending fixture.

Certain windshield designs, particularly in newer model automobiles, demand relatively tight wing bend radii, close to the short edge near the "A pillar". These bends prove to be difficult to produce in some cases using known bending fixture designs. Specifically, it is found that the wing "lever arm" is often too short to effectively bend the glass. This results in the glass having a tendency to "bridge" a part of the deep curve during the bending process and, thus, fail to achieve the required form or shape. It would be advantageous, therefore, to employ a bending fixture having a support surface which provides good conformance of the glass sheet to the desired shape during bending.

The foregoing and other objects, features, aspects and advantages of the present invention will become more apparent from the following disclosure and detailed description of certain preferred embodiments of the invention, when taken in conjunction with the accompanying drawings.

SUMMARY OF THE INVENTION

According to the present invention, an apparatus is provided for supporting a glass sheet during gravity bending of the sheet into a curved shape. Specifically, a bending fixture is provided having a pair of fixture sections, each having curved upper shaping surface segments. The shaping surface segment of each of the fixture sections is a curved ridge or narrow elongate surface having two ends. Each of the two ends of the shaping surface segment of one fixture section is attached to a corresponding one of the two ends of the shaping surface segment of the other fixture section. The ends are attached by hinges to define a single generally horizontally extending hinge axis or pivot axis. The fixture sections are movable about the hinge axis from an open position to a closed position. In the open position the shaping surface segments together form a discontinuous, generally horizontal support for a flat glass sheet. Specifically, a flat glass sheet is supported in the open position (i) at the ends of the shaping surface segments, that is, proximate the two hinges where the opposite ends of the hinge axis intersect the ends of the shaping surface segments, and (ii) also at a point or portion of the shaping surface segment of each fixture section remote from the hinge axis. Thus, for example, in the case of a typical motor vehicle windshield which is greater in dimension from right to left than from bottom to top (direction being with reference to a windshield oriented in a vertical plane, approximately as it would be installed in a vehicle) a flat glass sheet to be formed into such windshield by a gravity bending process supported on a bending fixture of the invention would be supported at peripheral points located at the right and left sides and at top and bottom peripheral points generally centered between the right and left peripheral support points.

It will be appreciated that a significant advantage of the invention flowing from the arrangement of peripheral support points is that a thin, cold flat glass sheet generally will not be required to span a lateral distance more than one-half its overall dimension. This is in contrast to known art bending fixtures of the type having a large central portion with two hinged wing portions, wherein a cold flat glass sheet spans a lateral dimension equal to the width of the central fixture portion, i.e. from the right hinge axis to the left hinge axis.

The shaping surface segments of the fixture sections of the bending apparatus of the present invention, in the closed position, cooperate with each other to form a substantially continuous peripheral support for the glass sheet in the intended curved shape. In this respect, the finished glass product is substantially the same as would be obtained using a more traditional bending fixture having a central portion and two wing portions hinged thereto. In fact, it is quite surprising in this respect that a bending fixture of the present invention, having a single hinge axis laterally centered in an area of least curvature, rather than a pair of wing portion hinge axes located at the areas of maximum curvature or bend, can successfully and efficiently produce sharply curved vehicle windshields and other curvo-planar glass products by otherwise conventional gravity bending techniques. The manner in which this is achieved, along with additional objects, features, aspects and advantages of the present invention will be better understood from the following detailed description of certain preferred embodiments of the invention, taken in conjunction with the accompanying drawings.

BRIEF DESCRIPTION OF THE DRAWINGS

The attached drawings illustrate a presently preferred embodiment of the invention, wherein like numerals refer to like elements in the various views and wherein.

DETAILED DESCRIPTION OF PREFERRED EMBODIMENTS

Figure 1:
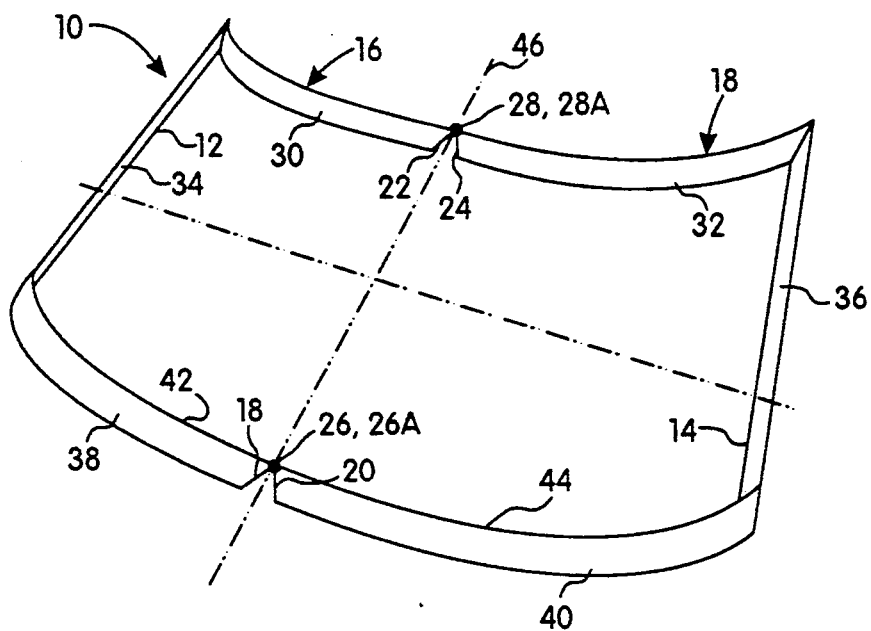
FIG. 1 is a perspective view of a glass bending fixture of the present invention, illustrated schematically, without a support base.

The apparatus of the present invention is suitable for use in a high temperature gravity bending process for the manufacture of curved glass products from flat glass sheets. It is especially suitable for use in the manufacture of motor vehicle windshields. For this reason and for the purpose of convenient exemplification, the discussion which follows will focus primarily on the manufacture of motor vehicle windshields employing a bending apparatus in accordance with the invention. In this regard, it should be understood that reference to the lateral dimension of the windshield and, correspondingly, of the bending fixture itself, is a reference to the right-left dimension of the windshield as it would be installed in a motor vehicle. Similarly, reference to the top and bottom of the windshield and, correspondingly, of the bending fixture, is a reference to the top-bottom dimension of the installed windshield. It will be assumed also for purposes of the following discussion that the windshield is somewhat wider than it is high, that is, longer in the right-to-left dimension than in the top-to-bottom dimension. Thus, the lateral dimension is greater than the height of the windshield.

It should be understood that reference herein to bending a glass sheet is meant to include also applications of the invention in which multiple glass sheets are bent simultaneously. In fact, as noted above, the bending fixture of the invention is especially well suited to bending glass sheets for motor vehicle windshields wherein, typically, two glass sheets are stacked together on the fixture for simultaneous bending.

As will be better understood from the following discussion, the laterally extending center line of a flat glass sheet supported on the bending fixture in the open position is generally in substantially the same horizontal plane as, and is substantially perpendicular to, the hinge axis or pivot axis between the two hinged fixture sections of the bending fixture. It will also be understood from the following discussion that the peripheral support points referred to are the points of contact between the support surface of the bending fixture and the bottom surface of the glass sheet as it sits on the bending fixture. The support points are peripheral in the sense that they are generally proximate the outer edge of the glass sheet, rather than being more centrally located. Correspondingly, reference to the support surface of the bending fixture as a peripheral support surface will be understood to mean that the support surface is a thin ridge or narrow, elongate support surface, rather than a broad planar support surface. The contact between the peripheral support surface of the bending fixture of the invention and the bottom surface of a glass sheet occurs at multiple spaced points when the glass is flat and, at least in preferred embodiments, occurs along the substantially continuous circuit of the support surface when the glass has been gravity sagged into conformity therewith. Thus, after bending, in preferred embodiments, a curvo-planar glass sheet is supported peripherally by a substantially continuous and endless curvolinear support surface.

Referring now to FIG. 1, an exemplary frame apparatus 10 for gravity bending glass according to this invention is shown. The frame 10 is preferably constructed of a light weight, rigid, metallic material. The frame is comprised of a pair of symmetrical fixture sections 12 and 14, each being generally U-shaped, though variations of the shape are possible. The U-shaped support surface segments of fixture sections 12 and 14 each has two free ends, a proximal end 18 and 20, respectively, and a distal end 22 and 24, respectively. Proximal ends 18 and 20 are at the portion of the frame apparatus corresponding generally to the center bottom of a windshield to be formed thereon. Distal ends 22 and 24 are at the portion corresponding generally to the top center of the windshield. The U-shaped fixture sections 12 and 14 each defines three regions, a distal region 30 and 32, respectively, a proximal region 38 and 40, respectively, and a bridging region 34 and 36, respectively, mediate the distal region and proximal region of the fixture. In many fixture designs these different regions will not be distinct but, rather, will transition smoothly from one to the next. They are distinguished herein primarily for ease of discussion and better understanding of the invention. The bridging regions 34 and 36 are laterally remote from the free ends 18, 20, 22, and 24. The bridging regions 34 and 36 connect the distal regions 30 and 32 with the proximal regions 38 and 40, respectively. Bridging region 34 corresponds to the left side of the windshield viewed from the passenger compartment of a motor vehicle in which the windshield is installed. Correspondingly, bridging region 36 corresponds to the right side of the windshield. For ease of illustration, bridging regions 34 and 36 are shown in the drawings to be essentially straight. For producing windshields in accordance with many modern designs, however, the bridging region will, in fact, be more U-shaped with high points at the junctures with the proximal and distal regions.

Fixture sections 12 and 14 each has an upper edge 16 and 18, respectively, defining the curved shaping surface segments on which the bottom surface of the glass sheet 48 rests. The distal, central and proximal regions of the fixture sections 12 and 14 may be formed integrally, or may be joined in a suitable manner, such as by welding. A significant feature of the fixture sections in the preferred embodiment of the invention illustrated is that the curved shaping surface segment defined by each fixture section is a substantially continuous curve. That is, the curved shaping surface is preferably a curvolinear line which forms substantially uninterrupted contact with the periphery of the bottom surface segments of the glass sheet (after gravity bending). Even with this constraint, the curved shaping surface segments may have any number of contours both vertically and horizontally. Referring to FIG. 1, the embodiment shown defines symmetrical shaping surface segments, each of which is generally concave in its distal region 30 and 32 and in its proximal region 38 and 40. Of course, variations in the shape of the curved shaping surface may be made and the specific shape and surface contour of each bending fixture will depend on the final product to be formed.

Corresponding proximal ends 18 and 20 are hinged together, as are corresponding distal ends 22 and 24, by hinges 26A and 28A, defining two hinge points 26 and 28, respectively. The hinge points 26 and 28 define a single hinge axis or peripheral support "parting line" 46 laterally centered in the fixture 10. A bending fixture having only one hinge axis 46 will be easier to lubricate and maintain than prior bending fixtures having multiple hinge axes. It is also a significant feature of the preferred embodiment illustrated that hinge axis 46 is laterally centered to intersect the peripheral support surface at points where a minimum of bending will take place during gravity bending of the glass. Because only two hinge points 26 and 28 are created, and because the hinge axis is located in a position where a minimum of bending occurs, the opportunity for hinge kinks and hinge distortion in the finished glass product is reduced.

Figure 2:
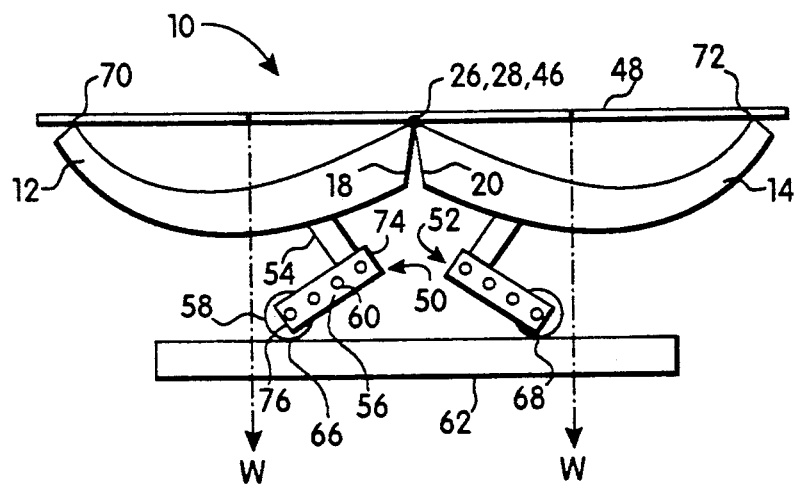
FIG. 2 is a lateral side view of a glass bending fixture and support base, illustrated schematically in the open position prior to heating, and loaded with a cold flat glass sheet.

Referring now to FIG. 2, the frame apparatus of FIG. 1 is shown with support means embodying additional significant features of preferred embodiments of the invention. A sheet of cold, flat glass 48 is shown being supported by fixture 10 in the open position. Glass 48 is supported proximate its periphery along the bridging regions 34 and 36 of the fixture sections 12 and 14. Specifically, the glass 48 will contact the fixture sections 12 and 14 at high points 70 and 72. It will be recognized that the support provided at the right and left lateral extremes of the glass by bridging regions 36 and 34, respectively, may be in the nature of line contact or point contact. As noted above, bending fixtures in accordance with the present invention adapted to produce windshields for many modern motor vehicle designs will have high points at the juncture between the bridging regions and the proximal and distal regions. In such cases, a flat glass sheet will be supported by the bending fixture at two spaced, laterally outboard contact points on each fixture section. In addition, the glass 48 is supported at hinge points 26 and 28 at free ends 18, 20, 22 and 24. Hinge axis 46 is proximate, i.e. immediately adjacent to, the bottom surface of the glass 48. That is, the hinge axis intersects or very nearly intersects the curved shaping surface formed by the shaping surface segments defined by upper edge 16 and 18 of the fixture sections. Thus, the fixture sections are bottom-opening, rather than top-opening at the hinge points.

The preferred embodiment illustrated in the drawings has a single hinge at each hinge point 26 and 28, the hinges each being located substantially coincident with the curvolinear support line defined by the upper edges 16 and 18 of the fixture sections. Alternative embodiments may involve more complex hinge mechanisms, it being an important feature of the illustrated bending fixture that the curvolinear support line formed by upper edges 16 and 18 is substantially unbroken at the hinge points when the bending fixture is in the open position and throughout the bending process as the bending fixture moves to its closed position. The bending fixture of the invention in this way avoids pinch points which, as discussed above, may mar the surface of the glass during movement of the bending fixture to its closed position during the bending process. During the bending process the unsupported center portion of the glass between points 26 and 28 will sag to a level below the hinge axis. The peripheral support surface, that is, the curvolinear line defined by the upper edges 16 and 18 of the fixture sections, however, will generally be in contact with the glass at all points after bending. Thus, even after bending, the hinge axis 46 will remain immediately adjacent to the peripheral support surface, (and, hence, to the bottom surface of the glass) at the hinge points 26 and 28.

Referring again to FIG. 2, wherein the frame is in the open position prior to bending and the fixture sections 12 and 14 form a discontinuous support for the glass sheet 48, fixture sections 12 and 14 are shown to be supported by support member pairs 50 and 52 (only one support member of each pair being shown) that extend downwardly in a generally vertical direction from the fixture sections 12 and 14 (only one support member of each pair being shown). Each support member of pairs 50 and 52 is comprised of a leg member 54, a foot member 56 and a roller 58. Leg member 54 is elongated and may be made from the same metallic material as the frame. It is fixedly attached to fixture section 12 by any suitable means, such as welding. Preferably, leg member 54 is at an angle approximating a right angle to the plane defined by the fixture section 12 at the point the leg member 54 is connected.

Foot member 56 is also elongated with an upper end 74 and lower end 76 and may be constructed from the same material as the frame and leg member 54. Foot member 56 is removably attached to leg member 54 by securing means such as a nut and bolt. In addition, foot member 56 has multiple attachment holes 60 along its length to allow adjustment in the position at which it is secured to leg member 54. Because foot member 56 is removably secured to leg member 54, and has a series of attachment holes 60, the effective length of foot member 56 can be shortened or lengthened as needed for reasons discussed below. Roller 58 is secured in any suitable manner, such as axle and bearing means, to foot member 56 proximate the lower end 76.

Figure 3:
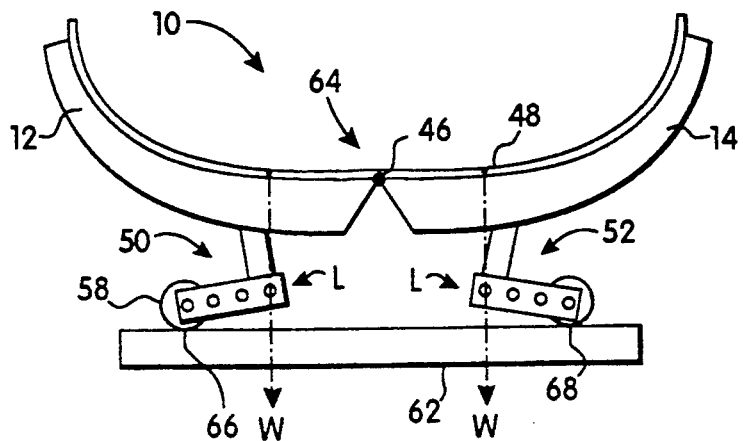
FIG. 3 is a lateral side view of the glass bending fixture and support base of FIG. 2 shown in the closed position with a glass sheet curved by heating to the form of the bending fixture.
Figure 4:
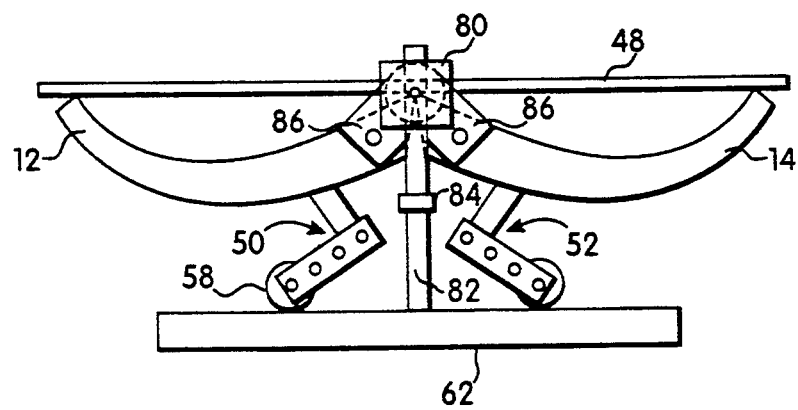
FIG. 4 is a lateral side view of the glass bending fixture and support base, illustrated schematically in the open position with a cold flat glass sheet, and showing bending fixture guide means.
Figure 5:
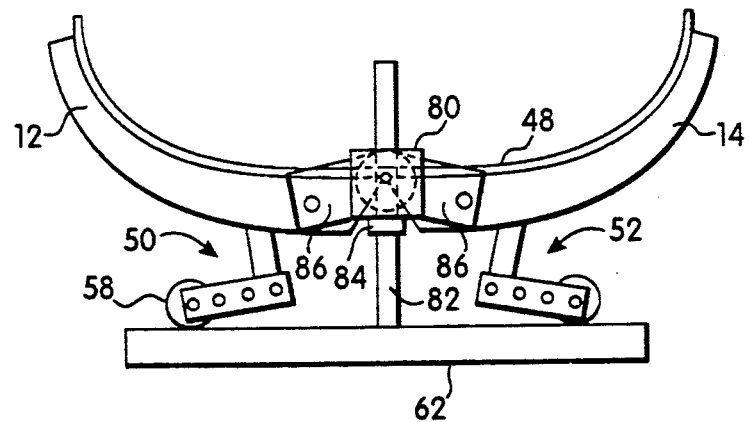
FIG. 5 is a lateral side view of the glass bending fixture and support base of FIG. 4 as shown in the closed position with the glass sheet curved by heating to the form of the bending fixture.

The frame 10 and support member pairs 50 and 52 are further supported by a fixture support base 62. The support members rollably contact the support base 62 at weight bearing points. Fixture support base designs are known to those skilled in the art and suitable designs for support base 62 for use in the present invention will be apparent to those skilled in the art in view of the present disclosure. In FIGS. 2 and 3 weight bearing points 66 and 68 are shown for the two illustrated support members. Restraint means preferably are provided to prevent the upper portion of the bending fixture riding on the wheels of the support member pairs from rolling off the support base 62. A lip can be provided, for example, in appropriate locations on the upper surface of support base 62 to define the range of travel of rollers 58. Preferably, however, suitable means are provided to control the degree of closure of the bending fixture and to control the position of the fixture sections on the support base. Travel limiting means such as, for example, clamp-on stops may be attached to vertical guide posts extending upwardly toward the hinge points from the base 62 to limit the frame closing travel. Preferred travel limiting means are illustrated in FIGS. 4 and 5. Specifically, guide means are shown to comprise a guide bearing 80 vertically slidably mounted on shaft 82. It will be understood that a corresponding shaft and guide bearing arrangement is provided at both the upper and lower hinge between the two fixture sections. Shaft 82 extends vertically upwardly from support base 62. A travel limiting stop or shaft collar 84 is provided to limit downward travel of the bearing. Each of the two fixture sections 12 and 14 are linked to the guide bearing 80 by symmetrical arms 86. FIG. 4 shows the bending fixture in the open position with guide bearing 80 near the top of shaft 82. FIG. 5 shows the bending fixture in the closed position after the glass 48 has sagged into conformance with the peripheral support surface of the bending fixture and guide bearing 80 has shifted downwardly into contact with shaft collar 84. The guide means operates to enhance the uniformity of the bending operation by causing the bending fixtures to move symmetrically one another from the open to the closed position. The guide means should be constructed of non-galling materials, in accordance with principles well known to those skilled in the art. Alternative suitable guide means will be apparent to those skilled in the art in view of the present disclosure.

The fixture support base 62 can be provided with bottom or side mounted rollers in accordance with known designs, on which the assembly can be moved through a lehr. The fixture support base 62 may have a generally rectangular shape with vertical posts at the corners to serve as stacking arms. The fixture support base should be rigid and durable. The base also preferably has standard dimensions, such that it can be used with different frames. It will be understood that the use of a fixture support base is routine in the art and does not constitute any part of certain embodiments of the current invention.

Referring now to FIG. 3, the frame 10 and support member pairs 50 and 52 are shown in the closed position, after the glass 48 has been heated and bent. As is readily apparent, fixture section 12 and 14 have shifted from their previous positions of FIG. 2. In the closed position, support surface segments of bending fixture sections 12 and 14 cooperate to form a substantially continuous curved peripheral support for the glass sheet 48. Hinge axis 46 is immediately adjacent to the bottom surface of the glass where the glass contacts the continuous curved peripheral support at hinge location 26 and 28. Moreover, hinge axis 46 is located in the region 64 of least curvature of the final bent glass sheet 48. In the context of bending glass for motor vehicle windshields, the laterally centered hinge axis provides the very significant advantage that gravity alone bends and stretches the glass in the critical driver and passenger portions of the windshields. Distortion is therefore reduced in the main vision area of the windshield for the driver and passenger.

In operation, frame 10 is placed upon support base 62 in the open position, as shown in FIG. 2. The glass sheet 48 to be bent is then placed upon the open frame 10. Frame 10 remains in the open position due to the interaction of the weight of the glass sheets 48 and the frame 10. The cold glass sheet 48 approximates an ideal uniformly loaded beam. In this position, the weight of the glass 48 is concentrated and bears only on the frame high points 70 and 72 and hinge points 26 and 28. The weight of the glass sheet may be represented by the two gravitational mass centroids "W" shown in FIG. 2. That is, the portion of the weight of the glass carried by each of the fixture sections 12 and 14, has a center of gravity located such that in the open, or cold glass, position, the gravity force vector falls outboard of the roller support points 66 and 68. That is, it is a significant operating feature of the preferred embodiment of the invention illustrated in FIGS. 2 and 3, that when the frame 10 is loaded with a cold glass sheet, the weight bearing points 66 and 68 are laterally inward of the gravitational mass centroids "W". This results in a stable configuration tending to hold the fixture sections 12 and 14 in the open position. The position of the foot member 56 can be adjusted, as noted above, to position the weight bearing point laterally inward of the gravitational mass centroids. Thus, the particular support structure of the frame 10 can be altered as requirements for stability in the open position change, such as when increased or decreased loads are used due to the stacking of glass sheets, or the configuration or size of the glass is altered.

Once the glass 48 softens and begins to slump, the total glass weight ceases to bear only on the frame high points 70 and 72 and hinge points 26 and 28. As a result, the loci of the gravitational mass centroids "W" progressively shift laterally inward, away from frame high points 70 and 72 toward the hinge axis 46. As the gravitational mass centroids shift laterally inward of weight bearing points 66 and 68, lateral force vectors "L", shown in FIG. 3, act upon the rollers 58, thus causing weight bearing points 66 and 68 to shift outward. This causes the frame 10 to move to the closed position and also provides bending force to the glass 48. Thus, in the closed position, the weight bearing points 66 and 68 are laterally outward of the then existing gravitational mass centroids "W", as illustrated in FIG. 3. When the frame 10 has reached the closed position, the bent glass 48 has taken on the shape of the fixture sections 12 and 14 and is supported by the continuous peripheral support surface comprised of the support surface segments of the two fixture sections.

Although presently preferred embodiments of the present invention have been described and illustrated, it is clearly understood that the same is by way of illustration and example only and is not to be taken by way of limitation. The spirit and scope of the present invention are limited only by the terms of the appended claims and their proper equivalents.

We claim:

1. Apparatus for supporting a glass sheet during gravity bending of the sheet into a curved shape, the apparatus, comprising a pair of fixture sections, each of the fixture sections having a curved upper shaping surface segment with, two ends, hinge means for hinging the ends to the corresponding ends of the other fixture section to define a horizontally extending hinge axis between the fixture sections, the hinged fixture sections being moveable about said hinge axis from an open position in which the shaping surfaces of the fixture sections cooperate with each other to form a discontinuous support for a flat glass sheet, the discontinuous support comprising the ends of the shaping surface segments and a portion of each shaping surface segment remote therefrom, to a closed position in which the shaping surface segments of the fixture sections cooperate with each other to form a substantially continuous peripheral support for a glass sheet in said curved shape, the hinge axis being immediately adjacent said continuous support at the ends of the shaping surface segments.

2. The apparatus of claim 1 where the hinge axis is in a region of the curved shape having approximately least curvature.

3. The apparatus of claim 1 wherein the upper shaping surface segment of each said fixture section is generally U-shaped.

4. Apparatus for supporting a glass sheet during gravity bending of the sheet into a curved shape, the apparatus comprising a pair of fixture sections, each of the fixture sections having a curved upper shaping surface segment with two ends, hinge means for hinging the end to the corresponding ends of the other fixture section to define a horizontally extending hinge axis between the fixture sections, and each of the fixture sections having at least one support member extending generally vertically downward from the fixture section to a weight bearing point, the hinged fixture sections being moveable about said hinge axis:

from an open position in which the shaping surface segments cooperate with each other to form a discontinuous support for a flat glass sheet, the discontinuous support comprising the ends of the shaping surface segments and a portion of each shaping surface laterally remote from the hinge axis, and in which the weight bearing points are laterally inward of the gravitational mass centroids of the two fixture sections;

to a closed position in which the shaping surface segments of the fixture sections cooperate with each other to form a substantially continuous peripheral support for the glass sheet in said curved shape, and in which the weight bearing points are laterally outward of the gravitational mass centroids of the two fixture sections;

the hinge axis at the ends of the shaping surfaces being immediately adjacent the continuous support and in a region of the curved shape having least curvature.

5. The apparatus of claim 4 wherein the shaping surface segment of each fixture section is generally U-shaped.

6. A method for gravity bending a glass sheet into a curved shape, the method comprising:

loading a glass sheet onto an apparatus comprising a pair of fixture sections, each fixture section having a curved upper shaping surface segment with two ends, each end of a fixture section being hinged to a corresponding end of the other fixture section to define a horizontally extending hinge axis between the fixture sections, about which hinge axis the fixture sections are moveable relative each other from an open position to a closed position, said glass sheet being supported by said fixture sections in said open position by the ends of the shaping surface segments and by a portion of each shaping surface segment remote from the hinge axis; and exposing the apparatus and the glass sheet thereon to an elevated temperature for a time sufficient to gravity bend the glass sheet to said curved shape and to move the fixture sections to said closed position in which the shaping surface segments cooperate with each other to form a substantially continuous peripheral support for the glass sheet in said curved shape, the hinge axis being immediately adjacent said continuous support at the hinged ends of the shaping surface segments in a region of the curved shape having approximately least curvature.

7. A method for gravity bending a glass sheet into a curved shape, the method comprising:

loading a glass sheet onto an apparatus comprising a pair of fixture sections, each fixture section having (a) a curved upper shaping surface segment with two ends, each end of a fixture section being hinged to a corresponding end of the other fixture section to define a horizontally extending hinge axis between the fixture sections, and (b) at least one support member extending generally vertically downward from the fixture section to a weight bearing point, the fixture sections being moveable relative each other about the hinge axis from an open position to a closed position, said glass sheet being supported by said fixture sections in said open position by the ends of the shaping surface segments and by a portion of each shaping surface segment remote from the hinge axis; and exposing the apparatus and the glass sheet thereon to an elevated temperature for a time sufficient to gravity bend the glass sheet to said curved shape and to move the fixture sections to said closed position in which the shaping surface segments cooperate with each other to form a substantially continuous peripheral support for the glass sheet in said curved shape, the hinge axis being immediately adjacent said continuous support at the hinged ends of the shaping surface segments in a region of the curved shape having approximately least curvature, and in which the weight bearing points are laterally outward of the gravitational mass centroids of the fixture sections.

* * * * *